United States Patent [19]

Ogawa et al.

[11] Patent Number: 5,558,472
[45] Date of Patent: Sep. 24, 1996

[54] METHOD AND APPARATUS FOR TRANSPORTING PARTICLES

[75] Inventors: Hiroyuki Ogawa; Seiji Hirata; Yoshizumi Sasaki, all of Ichihara, Japan

[73] Assignee: Sumitomo Chemical Company, Limited, Osaka, Japan

[21] Appl. No.: 319,020

[22] Filed: Oct. 6, 1994

[30] Foreign Application Priority Data

Oct. 7, 1993 [JP] Japan .................... 5-251632

[51] Int. Cl.$^6$ .................... B65G 53/66
[52] U.S. Cl. .................... 106/12; 406/85; 406/197
[58] Field of Search .................... 406/11, 12, 13, 406/18, 22, 46, 50, 85, 108, 109, 154, 197, 198

[56] References Cited

U.S. PATENT DOCUMENTS

| | | | |
|---|---|---|---|
| 3,295,896 | 1/1967 | Hurtig et al. | 406/85 |
| 3,837,540 | 9/1974 | Wagener | 406/85 |
| 3,858,943 | 1/1975 | Bose et al. | 406/50 |
| 4,087,134 | 5/1978 | Jordan et al. | |
| 4,535,134 | 8/1985 | de Lorenzo et al. | |
| 4,902,483 | 2/1990 | Raufast | |
| 5,023,223 | 6/1991 | Ebara et al. | |

FOREIGN PATENT DOCUMENTS

| | | | |
|---|---|---|---|
| 0071430 | 2/1983 | European Pat. Off. | |
| 466428A | 1/1992 | European Pat. Off. | 406/50 |
| 57-065703 | 4/1982 | Japan | |
| 59-019537 | 2/1984 | Japan | |
| 59-176305 | 10/1984 | Japan | |
| 61-21696 | 5/1986 | Japan | |
| 2-163104 | 6/1990 | Japan | |
| 0667977 | 8/1994 | Japan | |
| 574377 | 12/1975 | U.S.S.R. | 406/197 |
| 8203066 | 9/1982 | WIPO | 406/197 |

*Primary Examiner*—Gary C. Hoge
*Attorney, Agent, or Firm*—Birch, Stewart, Kolasch & Birch, LLP

[57] ABSTRACT

A method for transporting particles such as polyolefin particles from a first container to a second container. The particles are transported from the first container to the second container through a transportation pipe by means of a pressure difference between the first container and the second container. A valve is provided in the transportation pipe near the second container, and the valve is closed and opened to transmit particles intermittently. Cleaning gas is fed into the transportation pipe at a position on the inlet side near the valve. The cleaning gas is gas consisting essentially of olefin monomer. The cleaning gas is fed into the transportation pipe while the valve of the transportation pipe is closed, and the particles remaining in the transportation pipe are sent back to the first container thereby to clean the transportation pipe. Therefore, the inside of the transportation pipe is kept clean all the time.

32 Claims, 2 Drawing Sheets

METHOD AND APPARATUS FOR TRANSPORTING PARTICLES

BACKGROUND OF THE INVENTION

1. Field of the Invention

The present invention relates to a method and an apparatus for transporting particles, such as polyolefin particles, through a pipe.

2. Related Background Art

It is a very important subject to prevent a pipe from being clogged with particles while particles are transported from one container to another container through the pipe.

For example, when polyolefin particles are produced by a gas phase polymerization method in a primary reactor and transported to a secondary reactor in a next process or a storage tank through a transportation pipe, it is conventional to use a purge tank as one of the transporting means After the particles are drawn from the reactor or the storage tank into the purge tank, a sufficiently pressure difference is provided between the purge tank and the following reactor or the storage tank thereby transport the particles at high speed.

In the conventional method, the clogging of the transportation pipe is prevented by transporting polyolefin particles at high speed. However, this means is still unsatisfactory, and there is a tendency to clog the transportation pipe.

There is a case that lump polymer is formed in the polymerization reactor in the reaction process. The lump polymer may stick and remain in the transportation pipe, which causes the clogging of the transportation pipe. Also, if the particles which still have reactive abilities remain in the pipe, the polymerization reaction proceeds and clogging of the pipe occurs. Once the transportation pipe is clogged, starting from the clogged part, the clogging gets worse and worse. In this condition, the transportation pipe may be removed to take out the clogging objects. This may unwillingly lead to the shut-down of the polymerization reactor or cut of the production.

SUMMARY OF THE INVENTION

It is an object of the present invention to provide a method and apparatus for transporting particles, without clogging of a transportation pipe.

In order to achieve the object, a method for transporting particles from a first container to a second container through a transportation pipe according to the present invention comprises the steps of: providing a first valve in the transportation pipe; providing a supply source of cleaning gas to be supplied into the transportation pipe to clean inside of the transportation pipe; making a pressure of the first container higher than a pressure of the second container; making a pressure of cleaning gas supplied from the cleaning gas source higher than a pressure of the first container; closing and opening the first valve intermittently; supplying cleaning gas from the cleaning gas source into the transportation pipe while the first valve is closed; and stopping supply of cleaning gas from the cleaning gas source while the first valve is opened.

The transportation pipe is cleaned by feeding the cleaning gas into the pipe, so that the clogging of the pipe can be prevented effectively and the inside of the pipe is kept clean all the time. Consequently, shut-down of the polymerization container or reactor or cut of production can be avoided.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENTS

Figure 1:
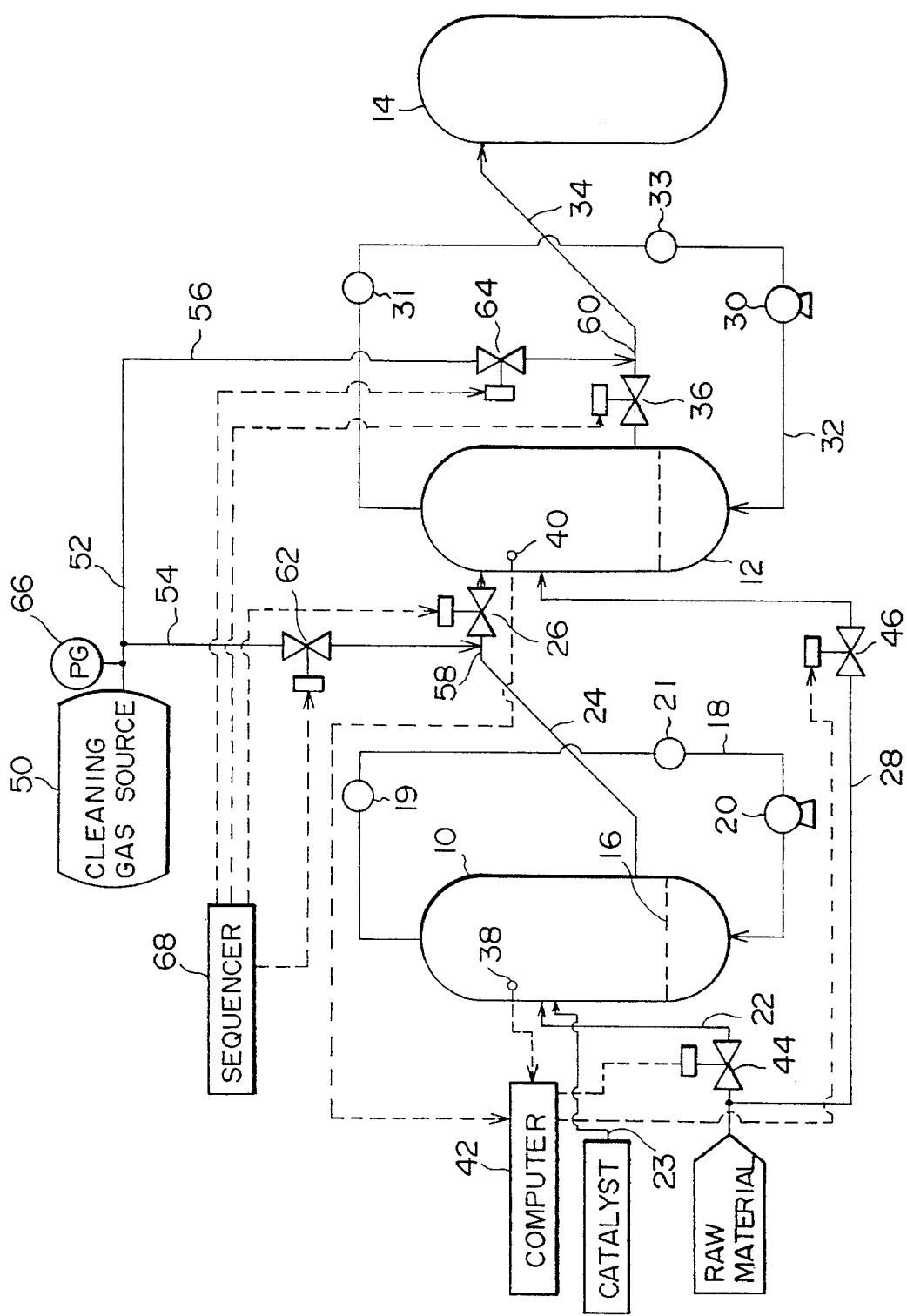
FIG. 1 is a view schematically showing the arrangement of a polypropylene production plant to which the present invention is applied.

Referring now to FIG. 1, there is shown the arrangement of a polypropylene production plant to which the present invention will be applied. In FIG. 1, reference numeral 10 designates a primary fluidized-bed reactor, numeral 12 designates a secondary fluidized-bed reactor, and numeral 14 designates a storage tank.

In the primary reactor 10, a mixed phase of gas comprising propylene monomer and polypropylene particles is formed, and fluidized by circulating gas from the bottom of the reactor 10 through a gas dispersion plate 16 placed in the lower part of the reactor 10. Generally, the fluidized-bed which is rich in particles is formed in the lower part of the primary fluidized-bed reactor 10, and the gas phase which is rich in gas is formed in the upper part of the reactor 10. Gas is circulated by the operation of a compressor 20 provided in a pipe 18 which is connected to the primary reactor 10 in loop from the top to the bottom of the reactor 10. In the pipe 18, a cyclone 19 for separating entrained fine powder from circulation gas and a heat exchanger 21 for cooling circulation gas are placed. Under this state in which the mixed phase is fluidized, propylene monomer as a raw material through a pipe 22 and a catalyst through a pipe 23 are supplied to the primary reactor 10. Then polymerization reaction proceeds and particles of polypropylene are produced. The thus produced polypropylene particles in the primary reactor 10 are transported from fluidized-bed in the primary reactor 10 to gas phase in the secondary polymerization reactor 12 through a transportation pipe 24.

Polypropylene particles are transported by means of a pressure difference between the primary reactor 10 and the secondary reactor 12. This pressure difference is preferably within a range of 1.5 kg/cm²–30 kg/cm². If the pressure difference is below 1.5 kg/cm², the transportation speed of particles is insufficient, whereas if the pressure difference is above 30 kg/cm², the vibration of the pipe 24 may increase. Especially, in the case of the polypropylene, in order to perform polymerization reaction and transportation of the particles successfully, it is important that a pressure difference between the reactor 10 and the reactor 12 is within a range of 1.5 kg/cm² to 30 kg/cm². The more preferable range of the pressure difference between the reactors 10 and 12 is 3 kg/cm² to 15 kg/cm².

A solenoid valve 26 is placed in the transportation pipe 24 near the secondary reactor 12. In general, polypropylene particles are transported intermittently by opening and closing the valve 26.

The construction of the secondary reactor 12 is substantially the same as that of the primary reactor 10. In other words, polypropylene particles are fluidized by gas circulated by a compressor 30 in a pipe 32. In the pipe 32, a cyclone 31 for separating entrained fine powder from circulation gas and a heat exchanger 33 for cooling circulation gas are placed. Then, polymerization reaction further proceeds by feeding raw material through a pipe 28, and polypropylene particles are produced as a product. Polypropylene particles as a product are transported from the fluidized bed in the secondary reactor 12 to the storage tank 14 through the transportation pipe 34 by means of a pressure difference between the secondary reactor 12 and the storage tank 14 and stored therein. Preferably, this pressure difference is within a range of 1.5 kg/cm²–30 kg/cm².

A solenoid valve 36 is placed in the transportation pipe 34 near the secondary reactor 12. In the same way as the transportation of particles from the primary reactor 10, particles are transported from the secondary reactor 12 intermittently by opening and closing the valve 36.

Pressure sensors 38 and 40 are placed in the primary reactor 10 and the secondary reactor 12, respectively. The internal pressure of the reactors 10 and 12 is observed by a controller comprising, e.g., a micro computer 42, all the time. When the controller 42 detects the variation of the internal pressure of the reactors 10 and 12 based on signals from the pressure sensors 38 and 40, the controller 42 controls flow control valves 44 and 46 interposed in the pipes 22 and 28 to control flow of the raw material, thereby maintaining the internal pressure of the reactors 10 and 12 constant, respectively.

In the embodiment shown in FIG. 1, one system is provided for feeding cleaning gas into the transportation pipes 24 and 34 in order to prevent a clogging object from being formed or to remove a clogging object, in the transportation pipes 24 and 34. This system comprises a source 50 for supplying the cleaning gas, and pipes 52, 54 and 56 for feeding cleaning gas from the cleaning gas source 50 into the transportation pipes 24 and 34. The pipe 54 is connected to the transportation pipe 24 between the primary reactor 10 and the secondary reactor 12 at the point 58 on the upper stream of and near the valve 26. The pipe 56 is connected to the transportation pipe 34 between the secondary reactor 12 and the storage tank 14 at the point 60 on the downstream of and near the valve 36. Solenoid valves 62 and 64 are provided in the pipes 54 and 56, respectively.

Reference numeral 66 in FIG. 1 is a pressure gauge placed in the pipe 52, and it is for measuring pressure of the cleaning gas from the cleaning gas source 50. The pressure of cleaning gas from the cleaning gas source 50 needs to be 1.5 kg/cm² or above, preferably 2.0 kg/cm² or above, higher than the internal pressure of the reactors 10 and 12. If the difference between the pressure of the cleaning gas and the internal pressure of the reactors 10 and 12 is lower than 1.5 kg/cm², the cleaning gas would not have a cleaning function, which will be described later. Further, the cleaning gas is preferably gas consisting of propylene monomer, so as not to lower the efficiency of polymerization reaction in the reactor 10.

Figure 2:
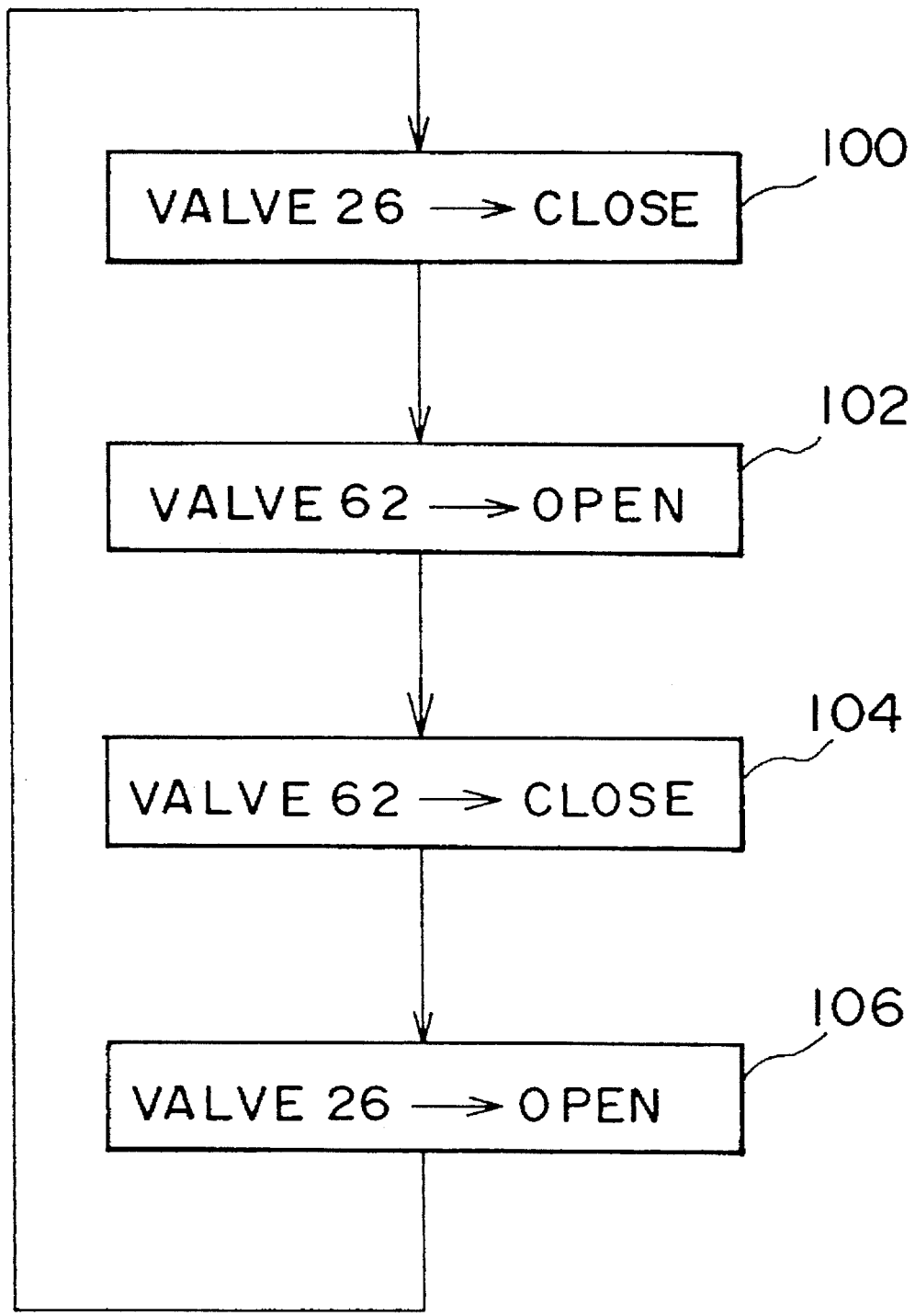
FIG. 2 is a flowchart showing the procedure of a method for transporting particles according to the present invention.

Next, referring to FIG. 2, a method of transporting particles according to the present invention, which is applied to the above-described arrangement, is described. This method is performed by controlling the valves 26, 36, 62 and 64 sequentially by a controller such as a sequencer 68 in the following way.

Transportation of polypropylene particles from the primary reactor 10 to the secondary reactor 12 will be explained. First, as shown in Steps 100 and 102 of FIG. 2, the valve 26 in the transportation pipe 24 is closed, and immediately thereafter or at the same time, the valve 62 of the cleaning gas feeding system is opened. In result, the cleaning gas is fed from the supply source 50 to the transportation pipe 24 through the pipes 52 and 54. The cleaning gas flows in the transportation pipe 24 towards the primary reactor 10 to send the particles, and clogging objects if present, in the transportation pipe 24 into the primary reactor 10 thereby to clean the inside of the transportation pipe 24.

Next, as shown in Step 104 of FIG. 2, the valve 62 is closed to stop the supply of cleaning gas. Immediately after the valve 62 is closed or at the same time, the valve 26 in the transportation pipe 24 is opened, and transportation of polypropylene particles from the primary reactor 10 to the secondary reactor 12 is started (Step 106). The duration of the valve 26 remaining open is decided so as to adjust a difference between an actual amount of particles and a desired amount of particles, in the primary reactor 10. Although the duration of the valve 62 or 64 remaining open, i.e. duration of one continuous supply of cleaning gas may be changed according to lengths or a diameters of the pipes, it generally is 1 second or above, preferably 3 seconds or above, more preferably 5 seconds or above.

Thereafter, a process goes back to Step 100, and Steps 100–106 are repeated. The valve 62 is opened all the time when the valve 26 is closed.

Further, similar to the transportation from the primary reactor 10, a product is transported from the secondary reactor 12 to the storage tank 14. In the case that the particles are transported from the secondary reactor 12 to the storage tank 14, cleaning gas may flow through the pipe 34 upstream, similar to the transportation from the primary reactor 10 to the secondary reactor 12. However, it is preferable to flow cleaning gas through pipe 34 downstream, thereby cleaning the inside of the pipe 34.

EXAMPLE 1

Polymerization reaction of propylene by a gas phase method was conducted in a reactor which can produce 5 to 9 tons per hour of polypropylene. The reaction was carried out using a solid catalyst component obtained by the same manner as in Example 1 in U.S. Pat. No. 5,023,223, which is incorporated by reference herein, along with triethylaluminum and cyclohexylethyldimethoxysilane. Pressure in the primary reactor 10 was set to 21 kg/cm²G, temperature therein to 75° C., pressure in the secondary reactor 12 to 17 kg/cm²G and temperature therein to 75° C. A pipe which had an inner diameter of 50 mm and a total length of 15 m was used as a transportation pipe 24. The valve 26 was provided at a position separated from the entrance of the secondary reactor 12 by 20 cm, and the pipe 54 was connected at a position on the upper stream of and near the valve 26. Propylene gas was used as cleaning gas and the pressure was 26 kg/cm²G.

Under these conditions, following Steps 100–106 in FIG. 2, the valves 24 and 62 were controlled and polypropylene was produced. After the plant ran for three consecutive months, the inside of the transportation pipe 24 was checked. Clogging did not occur in the transportation pipe 24.

EXAMPLE 2

The reaction was conducted under the same condition as the above-described example 1 except the valve 62 was closed all the time. In this case, the transportation pipe 24 was clogged after one hour or so and the plant was no table to run.

EXAMPLE 3

The reaction was conducted under the same condition as the above-described example 1 except propylene gas of 22.3 kg/cm$^2$G pressure was used as cleaning gas. In this case, a difference between the pressure of cleaning gas and the internal pressure of the primary reactor 10 was 1.3 kg/cm$^2$. In this example, it was found that clogging objects tended to be formed in the transportation pipe 24 within one or two days.

The preferred embodiment of the present invention has been explained; however, it will be apparent that the present invention is not limited to the above embodiment. For example, the above embodiment relates to the transportation of polypropylene but the present invention can be applied to the transportation of polyethylene, polyolefin such as α-olefin polymer etc. In this case, the cleaning gas is preferably a gas consisting essentially of ethylene monomer or α-olefin monomer.

In the above embodiments, there are two reactors. But if one reactor or three reactors are used, the present invention can be applied in such a case, which is obvious to one skilled in the art.

Although it is effective when the present invention is applied to a pipe for transporting polyolefin particles, the present invention can be applied to any type of pipe through which particles flow. Generally, particles to be transported have a diameter of 10 μm–3000 μm, preferably 100 μm–2000 μm and more preferably 200 μm–1500 μm, and a bulk density of 0.2 g/cm$^3$–1.0 g/cm$^3$ and more preferably 0.3 g/cm3 –0.9 g/cm$^3$. Typically, these particles are transported through a pipe the inner surface of which is smooth and which has a diameter of 10 mm–500 mm and a length of 1 m–200 m, and to which the present invention can be applied.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

The basic Japanese Application No. 5-251,632 filed on Oct. 7, 1993 is hereby incorporated by reference.

What is claimed is:

1. A method for transporting particles, which comprises:

providing a first container containing particles and a second container;

providing a transportation pipe that connects said first container to said second container;

providing a first valve in said transportation pipe;

providing a supply source of cleaning gas to be supplied into said transportation pipe to clean inside of said transportation pipe;

making a pressure of said first container higher than a pressure of said second container;

making a pressure of cleaning gas supplied from said cleaning gas source higher than a pressure of said first container;

closing and opening said first valve to transport the particles from said first container to said second container intermittently;

supplying cleaning gas from said cleaning gas source into said transportation pipe while first valve is closed; and stopping supply of cleaning gas from said cleaning gas source while said first valve is opened.

2. A method for transporting particles according to claim 1, wherein a cleaning gas pipe is provided between said cleaning gas source and said transportation pipe; and a second valve is provided in said cleaning gas pipe; and said second valve is closed and opened thereby to control the supply of cleaning gas into said transportation pipe.

3. A method for transporting particles according to claim 1, wherein said first valve is provided in said transportation pipe near said second container.

4. A method for transporting particles according to claim 3, wherein the cleaning gas is fed into said transportation pipe at a position near said first valve on the first container side.

5. A method for transporting particles according to claim 1, wherein said first valve is provided in said transportation pipe near said first container.

6. A method for transporting particles according to claim 5, wherein the cleaning gas is fed into said transportation pipe at a position near said first valve on the second container side.

7. A method for transporting particles according to claim 1, wherein a difference between the pressure of said first container and the pressure of said second container is within a range of 1.5 kg/cm$^2$ to 30 kg/cm$^2$.

8. A method for transporting particles according to claim 1, wherein a difference between the pressure of said first container and the pressure of said second container is within a range of 3 kg/cm$^2$ to 15 kg/cm$^2$.

9. A method for transporting particles according to claim 1, wherein a difference between the pressure of cleaning gas supplied from said cleaning gas source and the pressure of said first container is 1.5 kg/cm$^2$ or above.

10. A method for transporting particles according to claim 1, wherein a difference between the pressure of cleaning gas supplied from said cleaning gas source and the pressure of said first container is 2 kg/cm$^2$ or above.

11. A method for transporting particles according to claim 1, wherein said particle is polyolefin.

12. A method for transporting particles according to claim 11, wherein said cleaning gas is gas consisting essentially of olefin monomer.

13. A method for transporting particles according to claim 11, wherein said particle is polypropylene.

14. A method for transporting particles according to claim 13, wherein said cleaning gas is propylene gas.

15. A method for transporting particles according to claim 11, wherein each of said first container and said second container is selected from the group consisting of a reactor for gas phase polymerization and a storage tank therefor, with proviso that if said first container is a storage tank, then said second container is also a storage tank.

16. A method for transporting particles according to claim 1, wherein duration of one continuous supply of said cleaning gas is 3 seconds or above.

17. An apparatus for transporting particles which comprises:

a first container and a second container;

a transportation pipe communicating between said first container and said second container;

a first valve provided in said transportation pipe;

a supply source of cleaning gas for cleaning inside of said transportation pipe;

a cleaning gas pipe communicating between said cleaning gas source and said transportation pipe;

a second valve provided in said cleaning gas pipe; and a control device for controlling said first and second valves so that said first valve is opened and closed to transport the particles from said first container to said second container intermittently, and so that while said first valve is closed, said second valve is opened to supply the cleaning gas from said cleaning gas source into said transportation pipe, and while said first valve is opened, said second valve is closed; wherein a difference between the pressure of cleaning gas supplied from said gas source and the pressure of said first container is 1.5 kg/cm$^2$ or above.

18. A particles transporting apparatus according to claim 17, wherein said first valve is provided in said transportation pipe near said second container.

19. A particles transporting apparatus according to claim 18, wherein said cleaning gas pipe is connected to said transportation pipe at a position near said first valve on the first container side.

20. A particles transporting apparatus according to claim 17, wherein said first valve is provided in said transportation pipe near said first container.

21. A particles transporting apparatus according to claim 20, wherein said cleaning gas pipe is connected to said transportation pipe at a position near said first valve on the second container side.

22. A particles transporting apparatus according to claim 17, wherein a difference between the pressure of said first container and the pressure of said second container is within a range of 1.5 kg/cm$^2$ to 30 kg/cm$^2$.

23. A particles transporting apparatus according to claim 17, wherein a difference between the pressure of said first container and the pressure of said second container is within a range of 3 kg/cm$^2$ to 15 kg/cm$^2$.

24. A particles transporting apparatus according to claim 17, wherein a difference between the pressure of cleaning gas supplied from said cleaning gas source and the pressure of said first container is 2 kg/cm$^2$ or above.

25. A particles transporting apparatus according to claim 17, wherein said particle is polyolefin.

26. A particles transporting apparatus according to claim 25, wherein said cleaning gas is gas consisting essentially of olefin monomer.

27. A particle transporting apparatus according to claim 25, wherein said first container particles of polypropylene.

28. A particles transporting apparatus according to claim 27, wherein said cleaning gas is propylene gas.

29. A particles transporting apparatus according to claim 25, wherein each of said first container and said second container is selected from the group consisting of a reactor for gas phase polymerization and a storage tank therefor, with the proviso that if said first container is a storage tank, then said second container is also a storage tank.

30. A particles transporting apparatus according to claim 17, wherein duration of one continuous supply of said cleaning gas is 3 seconds or above.

31. A particles transporting apparatus according to claim 17, wherein said first and second valves are solenoid valves.

32. An apparatus for transporting particles, which comprises a first container and a second container;

a transportation pipe communicating between said first container and said second container;

a first valve provided in said transportation pipe;

a supply source of cleaning gas for cleaning inside of said transportation pipe;

a cleaning gas pipe communicating between said cleaning gas source and said transportation pipe;

a second valve provided in said cleaning gas pipe; and a control device for controlling said first and second valves so that said first valve is opened and closed to transport the particles from said first container to said second container intermittently, and so that while said first valve is closed, said second valve is opened to supply the cleaning gas from said cleaning gas source into said transportation pipe, and while said first valve is opened, said second valve is closed; wherein the pressure of cleaning gas supplied from said cleaning gas source is greater than the pressure of said first container.

* * * * *